US012773765B2

(12) United States Patent
Rux

(10) Patent No.: US 12,773,765 B2
(45) Date of Patent: Oct. 27, 2026

(54) POWERED FASTENER DRIVER HAVING SPLIT GEAR BOX

(71) Applicant: MILWAUKEE ELECTRIC TOOL CORPORATION, Brookfield, WI (US)

(72) Inventor: Andrew P. Rux, Greendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 125 days.

(21) Appl. No.: 18/201,347

(22) Filed: May 24, 2023

(65) Prior Publication Data

US 2023/0311285 A1 Oct. 5, 2023

Related U.S. Application Data

(62) Division of application No. 17/888,839, filed on Aug. 16, 2022, now Pat. No. 11,865,685, which is a (Continued)

(51) Int. Cl.
*B25C 1/04* (2006.01)
*B25C 1/00* (2006.01)
*B25C 1/06* (2006.01)

(52) U.S. Cl.
CPC .............. *B25C 1/047* (2013.01); *B25C 1/008* (2013.01); *B25C 1/06* (2013.01)

(58) Field of Classification Search
CPC ..... B25C 1/00; B25C 1/04–048; B25C 1/008; B25C 1/06
See application file for complete search history.

(56) References Cited

U.S. PATENT DOCUMENTS

| | | | |
|---|---|---|---|
| 6,899,260 | B2 | 5/2005 | Sun |
| 6,971,567 | B1 | 12/2005 | Cannaliato et al. |

(Continued)

FOREIGN PATENT DOCUMENTS

| | | | |
|---|---|---|---|
| CN | 2081783 | U1 | 7/1991 |
| CN | 109623736 | A | 4/2019 |

(Continued)

OTHER PUBLICATIONS

Partial Supplementary European Search Report for Application No. 19875694.2 dated Jun. 20, 2022 (11 pages).

(Continued)

*Primary Examiner* — Himchan Song
(74) *Attorney, Agent, or Firm* — Michael Best & Friedrich LLP

(57) ABSTRACT

A fastener driver includes a nosepiece for receiving fasteners from a magazine, a driver blade movable from a ready position toward a driven position during which a fastener positioned in the nosepiece is driven into a workpiece, a lifting mechanism operable to return the driver blade from the driven position toward the ready position for a subsequent fastener driving operation, and a drivetrain to provide toque to the lifting mechanism. The drivetrain includes an electric motor having a motor output shaft, a first gear box coupled to the motor output shaft to receive torque therefrom, a second gear box having an output shaft coupled to the lifting mechanism to provide torque thereto, and a drive shaft having a first end coupled to the first gear box and a second end coupled to the second gear box for transferring torque from the first gear box to the second gear box.

18 Claims, 5 Drawing Sheets

Related U.S. Application Data division of application No. 16/658,986, filed on Oct. 21, 2019, now Pat. No. 11,446,802.

(60) Provisional application No. 62/750,290, filed on Oct. 25, 2018.

(56) References Cited

U.S. PATENT DOCUMENTS

| | | | | |
|---|---|---|---|---|
| 7,104,432 | B2 | 9/2006 | Sun | |
| 7,832,610 | B2 | 11/2010 | Tanimoto et al. | |
| 8,186,553 | B2 | 5/2012 | Tanimoto et al. | |
| 8,251,271 | B2 | 8/2012 | Nakano et al. | |
| 8,393,512 | B2 | 3/2013 | Tanimoto et al. | |
| 8,550,320 | B2 | 10/2013 | Nakano et al. | |
| 8,550,324 | B2 | 10/2013 | Coleman | |
| 8,561,869 | B2 | 10/2013 | Towfighi | |
| 8,720,765 | B2 | 5/2014 | Tanimoto et al. | |
| 9,662,777 | B2 | 5/2017 | Pomeroy et al. | |
| 9,701,001 | B2 | 7/2017 | Fleischer et al. | |
| 9,724,812 | B2 | 8/2017 | Scabin et al. | |
| 9,827,659 | B2 | 11/2017 | Matsuno | |
| 10,004,503 | B2 | 6/2018 | Huang | |
| 10,464,197 | B2 | 11/2019 | McNeill et al. | |
| 10,569,403 | B2 | 2/2020 | Namouz | |
| 10,589,409 | B2 | 3/2020 | Scabin et al. | |
| 10,654,154 | B2 | 5/2020 | Schnell et al. | |
| 10,759,029 | B2 | 9/2020 | Schnell et al. | |
| 10,821,585 | B2 | 11/2020 | Kabbes et al. | |
| 10,843,317 | B2 | 11/2020 | Sato et al. | |
| 10,898,994 | B2 | 1/2021 | Carrier et al. | |
| 11,110,576 | B2 | 9/2021 | Namouz | |
| 2001/0031179 | A1 | 10/2001 | Potter et al. | |
| 2006/0091177 | A1 | 5/2006 | Cannaliato et al. | |
| 2007/0272422 | A1* | 11/2007 | Coleman | B25C 1/06 173/1 |
| 2008/0190988 | A1 | 8/2008 | Pedicini et al. | |
| 2009/0090759 | A1* | 4/2009 | Leimbach | B25C 1/047 227/10 |
| 2009/0294504 | A1 | 12/2009 | Kunz et al. | |
| 2011/0036885 | A1 | 2/2011 | Leimbach et al. | |
| 2011/0303718 | A1 | 12/2011 | Spasov et al. | |
| 2014/0202724 | A1* | 7/2014 | Moore | B25C 1/047 173/46 |
| 2015/0375381 | A1 | 12/2015 | Tanji | |
| 2016/0176032 | A1 | 6/2016 | Tanji | |
| 2016/0288305 | A1* | 10/2016 | McCardle | B25C 1/06 |
| 2017/0129085 | A1* | 5/2017 | Miyashita | B25C 5/15 |
| 2017/0361444 | A1* | 12/2017 | Namouz | B25C 1/047 |
| 2018/0147709 | A1 | 5/2018 | Masatoshi et al. | |
| 2019/0314967 | A1 | 10/2019 | Garces et al. | |
| 2019/0375084 | A1 | 12/2019 | Bierdeman et al. | |
| 2020/0114500 | A1 | 4/2020 | Bierdeman et al. | |
| 2020/0130157 | A1 | 4/2020 | Rux | |
| 2020/0164498 | A1 | 5/2020 | Wechselberger et al. | |
| 2020/0189080 | A1* | 6/2020 | Aizawa | B25C 1/06 |
| 2020/0189081 | A1 | 6/2020 | Yang et al. | |
| 2020/0391364 | A1* | 12/2020 | Yasutomi | B25C 1/047 |
| 2021/0016424 | A1 | 1/2021 | Kabbes et al. | |
| 2021/0031347 | A1 | 2/2021 | Sato et al. | |
| 2021/0101272 | A1* | 4/2021 | Saitou | B25C 1/047 |
| 2021/0299837 | A1 | 9/2021 | Garces et al. | |
| 2021/0347022 | A1 | 11/2021 | Leathrum et al. | |

FOREIGN PATENT DOCUMENTS

| | | | |
|---|---|---|---|
| CN | 110253505 | A | 9/2019 |
| CN | 212763319 | U | 3/2021 |
| DE | 202010012259 | U1 | 12/2010 |
| EP | 1652624 | B1 | 6/2012 |
| EP | 1652626 | B1 | 8/2012 |
| JP | H0747270 | B2 | 5/1995 |
| JP | 2000006051 | A | 1/2000 |
| WO | 2006124498 | A2 | 11/2006 |
| WO | 2008117880 | A1 | 10/2008 |
| WO | 2008123485 | A1 | 10/2008 |
| WO | 2010038834 | A1 | 4/2010 |
| WO | 2011010634 | A1 | 1/2011 |
| WO | 2018056325 | A1 | 3/2018 |
| WO | 2018100943 | A1 | 6/2018 |
| WO | 2020248531 | A1 | 12/2020 |

OTHER PUBLICATIONS

International Search Report and Written Opinion for Application No. PCT/US2019/057233 dated Feb. 7, 2020 (10 pages).

* cited by examiner

POWERED FASTENER DRIVER HAVING SPLIT GEAR BOX

CROSS REFERENCE TO RELATED APPLICATIONS

This application is a divisional of U.S. patent application Ser. No. 17/888,839 filed on Aug. 16, 2022, now U.S. Pat. No. 11,865,685, which is a divisional of U.S. patent application Ser. No. 16/658,986 filed on Oct. 21, 2019, now U.S. Pat. No. 11,446,802, which claims priority to U.S. Provisional Patent Application No. 62/750,290 filed on Oct. 25, 2018, the entire contents of all of which are hereby incorporated by reference.

FIELD OF THE INVENTION

The present invention relates to powered fastener drivers, and more specifically to drivetrains for powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a fastener driver comprising a housing defining a handle portion, a magazine in which fasteners are held, a nosepiece for receiving fasteners from the magazine, a driver blade movable from a ready position toward a driven position during which a fastener positioned in the nosepiece is driven into a workpiece, a lifting mechanism operable to return the driver blade from the driven position toward the ready position for a subsequent fastener driving operation, and a drivetrain to provide torque to the lifting mechanism. At least a portion of the drivetrain is positioned within and extends through the handle portion of the housing.

The present invention provides, in another aspect, a fastener driver comprising a nosepiece for receiving fasteners from a magazine, a driver blade movable from a ready position toward a driven position during which a fastener positioned in the nosepiece is driven into a workpiece, a lifting mechanism operable to return the driver blade from the driven position toward the ready position for a subsequent fastener driving operation, and a drivetrain to provide toque to the lifting mechanism. The drivetrain includes an electric motor having a motor output shaft, a first gear box coupled to the motor output shaft to receive torque therefrom, a second gear box having an output shaft coupled to the lifting mechanism to provide torque thereto, and a drive shaft having a first end coupled to the first gear box and a second end coupled to the second gear box for transferring torque from the first gear box to the second gear box.

Other aspects of the invention will become apparent by consideration of the detailed description and accompanying drawings.

Figure 1:
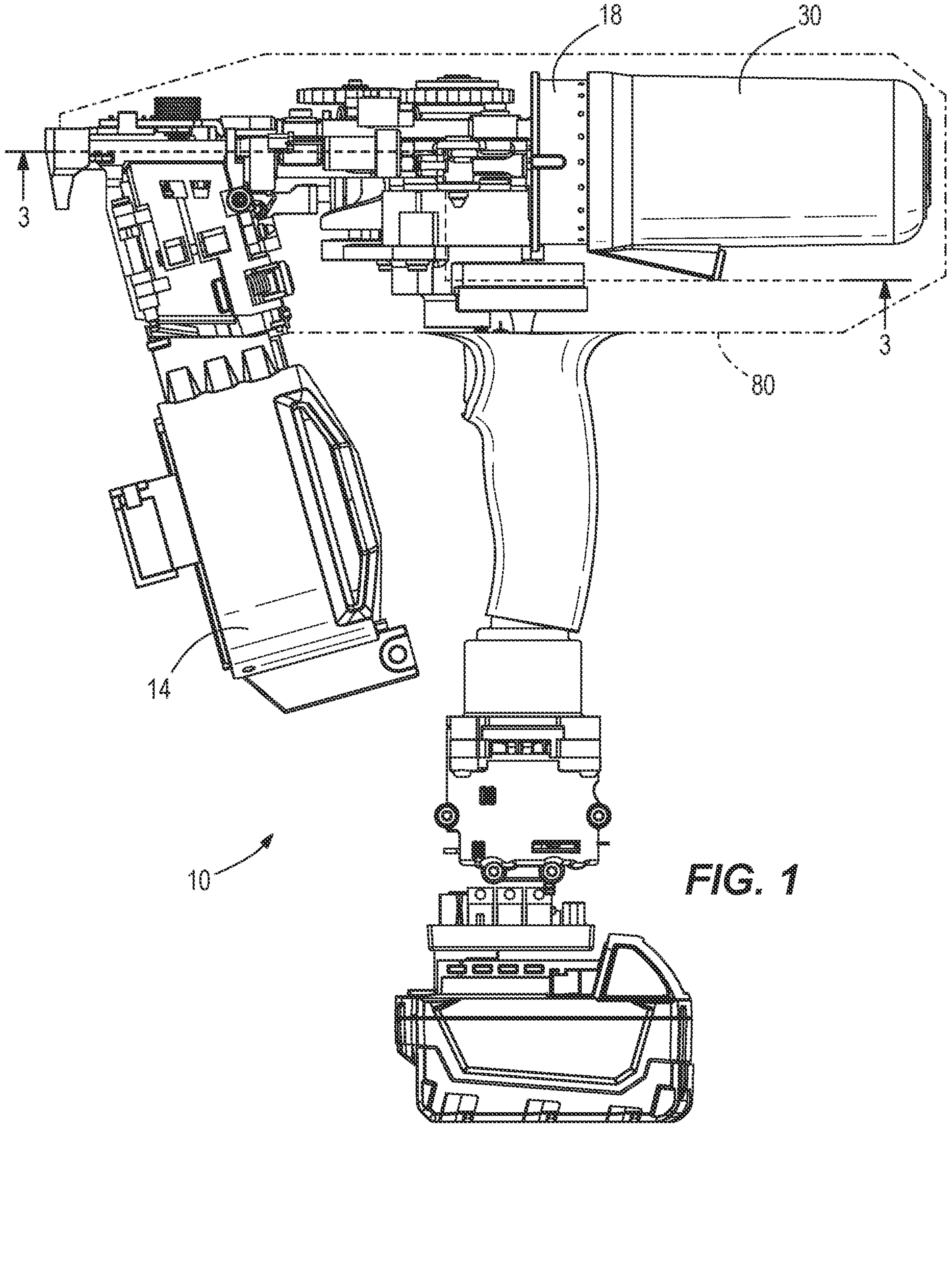
FIG. 1 is a plan view of a powered fastener driver, with portions removed.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

With reference to FIGS. 1-4, a gas spring-powered fastener driver 10 is operable to drive fasteners (e.g., nails) held within a canister magazine 14 into a workpiece. The fastener driver 10 includes a cylinder 18 and a moveable piston 22 positioned within the cylinder 18. The fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30.

Figure 2:
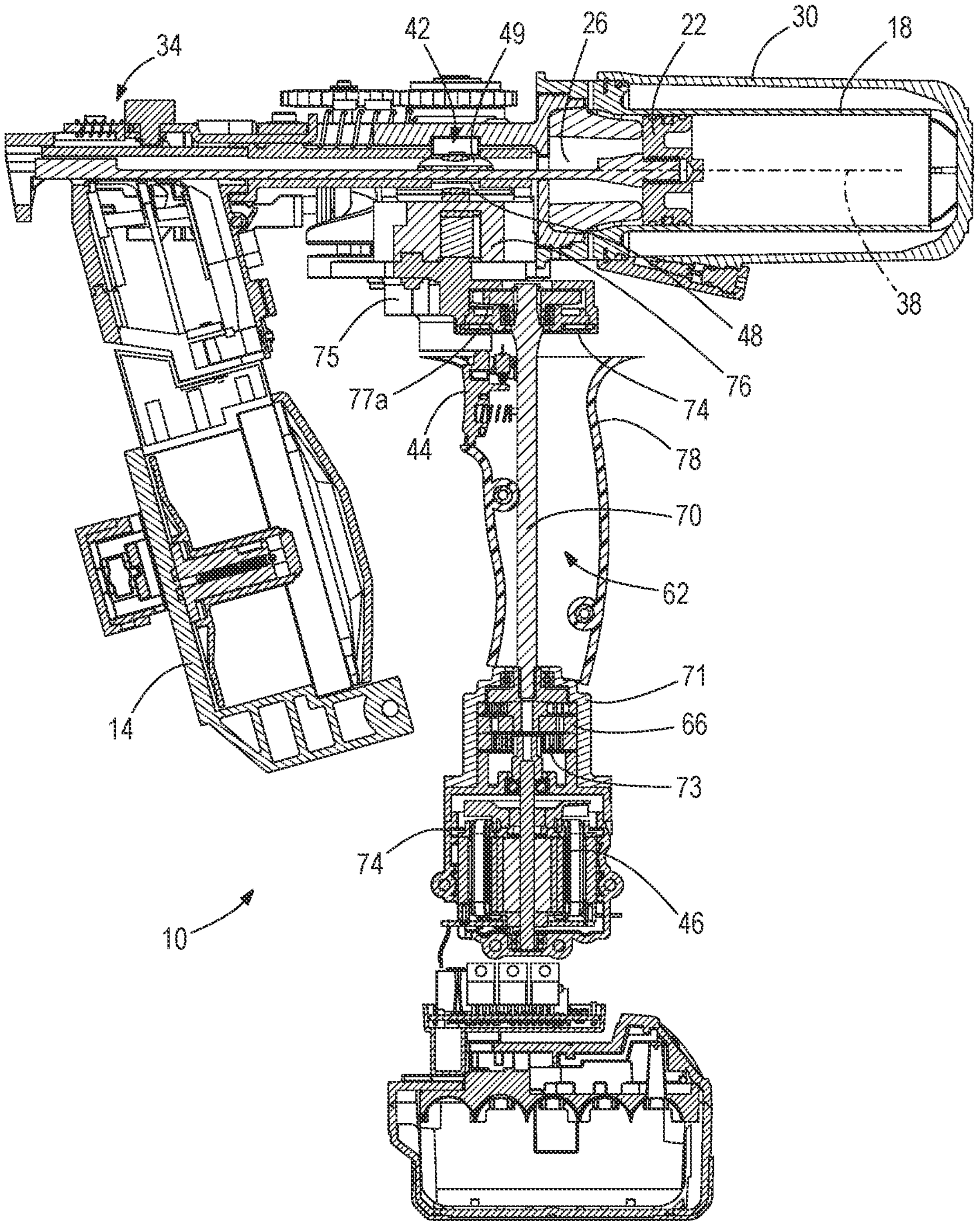
FIG. 2 is a cross-sectional view of the fastener driver of FIG. 1 through line 2-2 in FIG. 3, illustrating a drivetrain.
Figure 3:
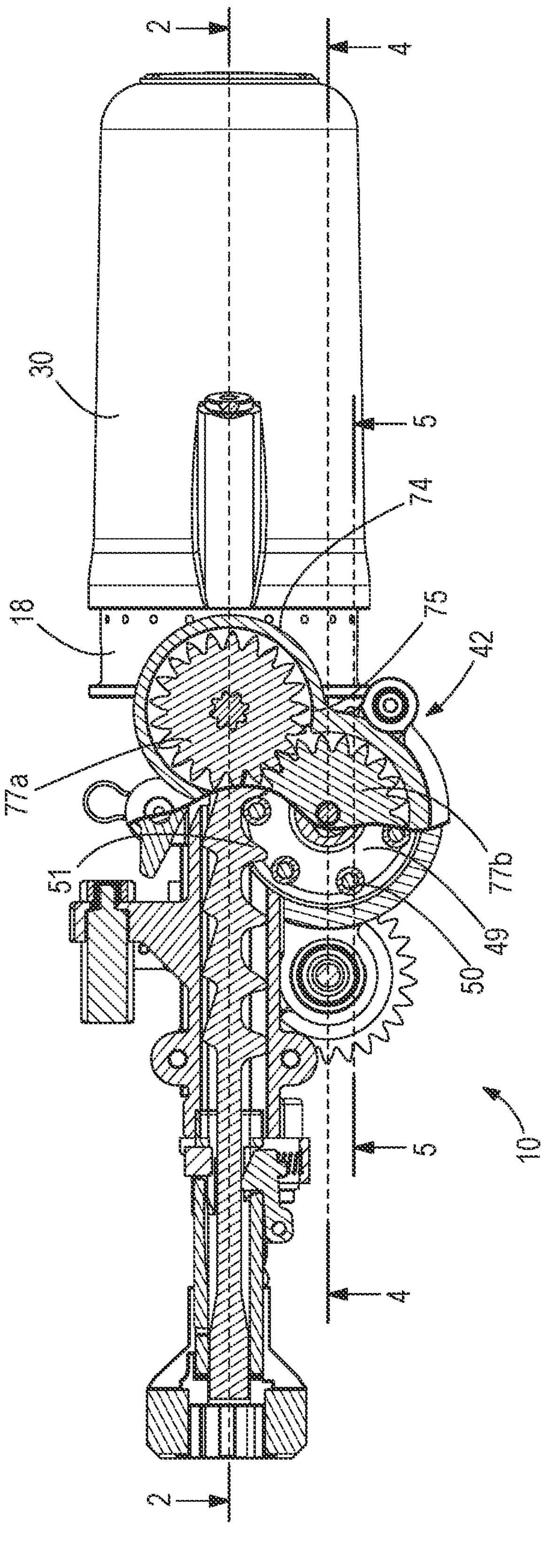
FIG. 3 is a cross-sectional view of the fastener driver of FIG. 1 through line 3-3 in FIG. 1.

With reference to FIGS. 2 and 3, the cylinder 18 and the driver blade 26 define a driving axis 38, and during a driving cycle the driver blade 26 and piston 22 are moveable from a ready position (i.e., near top dead center) toward a driven position (i.e., bottom dead center), during which a fastener in a nosepiece 34 of the driver 10 is driven into a workpiece.

The fastener driver 10 further includes a lifting mechanism 42, which is powered by an electric motor 46, and which is operable to move the driver blade 26 from the driven position to the ready position. With continued reference to FIG. 2 the lifting mechanism 42 includes a rotary lifter 49 having pins 50 that engage corresponding teeth 51 of a rack 48, which is defined on the driver blade 26. As rotational motion is applied to the rotary lifter 49 by the motor 46, the rotary lifter 49 causes the rack 48 to translate, thus moving the driver blade 26 and the attached piston 22 from the driven position toward the ready position.

In operation, the lifting mechanism 42 drives the piston 22 and the driver blade 26 to the ready position by energizing the motor 46. As the piston 22 and the driver blade 26 are driven to the ready position, the gas above the piston 22 and the gas within the storage chamber cylinder 30 is compressed. Once in the ready position, the piston 22 and the driver blade 26 are held in position until released by user activation of a trigger 44. When released, the compressed gas above the piston 22 and within the storage chamber 30 drives the piston 22 and the driver blade 26 to the driven position, thereby driving a fastener into a workpiece. The illustrated fastener driver 10 therefore operates on a gas spring principle utilizing the lifting mechanism 42 and the piston 22 to again compress the gas within the cylinder 18 and the storage chamber cylinder 30 when the piston 22 and the driver blade 26 are returned to the ready position.

With reference to FIG. 2, the lifting mechanism 42 is driven by a drivetrain 62, which includes the electric motor 46, a first gearbox 66, a drive shaft 70, and a second gearbox 74. In the illustrated embodiment of the drivetrain 42, the first gearbox 66 includes a first gear case 71 affixed to a motor housing 72 of the electric motor 46, and a multi-stage planetary transmission 73 disposed within the first gear case 71. In other embodiments, the multi-stage planetary transmission 73 may be replaced with a single-stage planetary transmission (not shown). The motor 46 includes a motor output shaft to provide input torque to the transmission 73, which includes an output carrier that rotates at a reduced rotational speed compared to that of the motor output shaft. The second gearbox 74 includes a second gear case 75 affixed to a lifting mechanism housing 76 of the lifting mechanism 42 and offset spur gears 77*a*, 77*b* rotatably supported within the housing. In the illustrated embodiment of the drivetrain 62, the spur gears 77*a*, 77*b* include the same number of teeth; therefore, the second gearbox 74 does not provide any additional speed reduction. Alternatively, the input spur gear 77*a* may include fewer teeth than the output spur gear 77*b*, thereby providing the gearbox 74 with a speed reduction ratio that is greater than 1:1.

Figure 4:
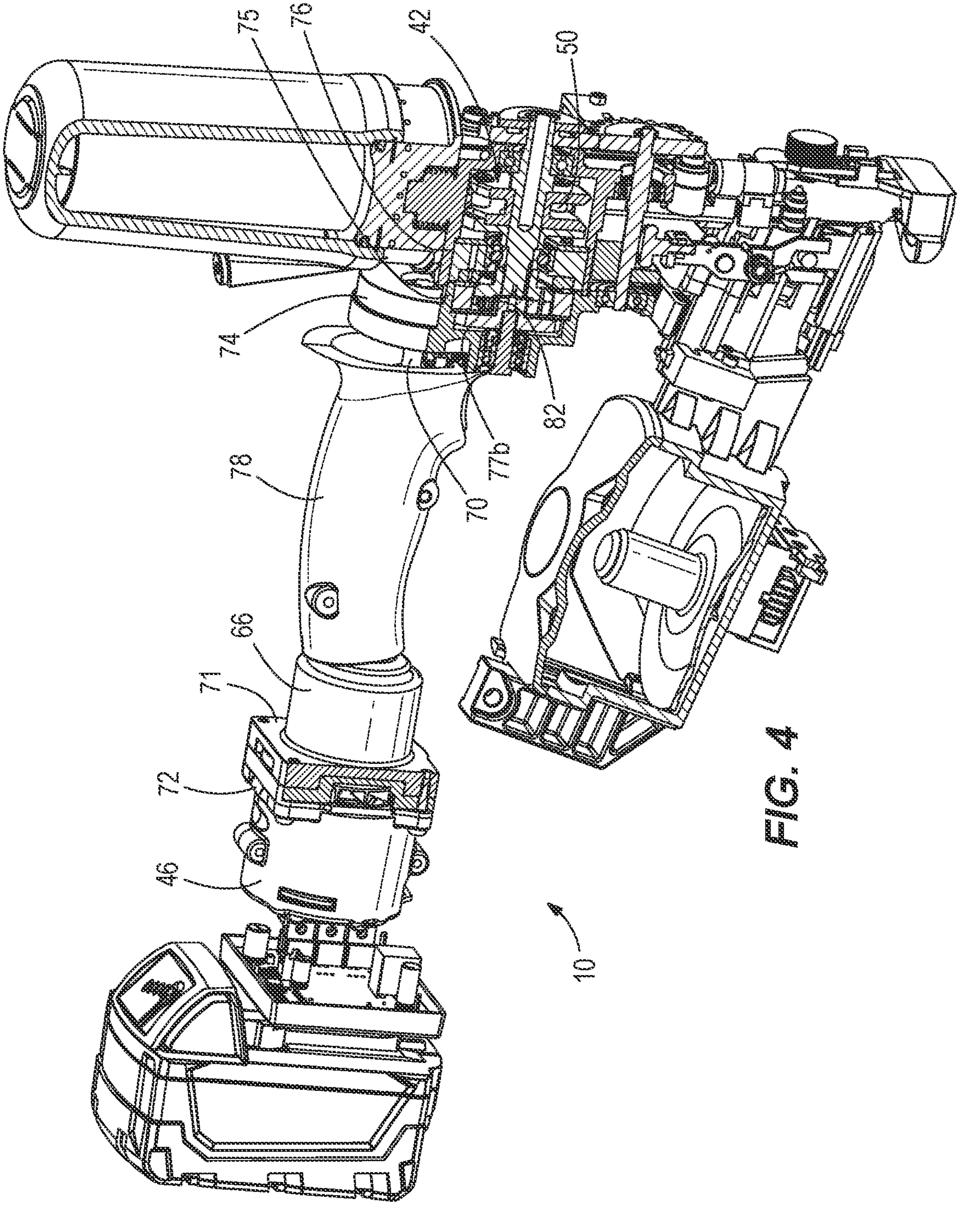
FIG. 4 is a cross-sectional view of the fastener driver through line 4-4 in FIG. 3.
Figure 5:
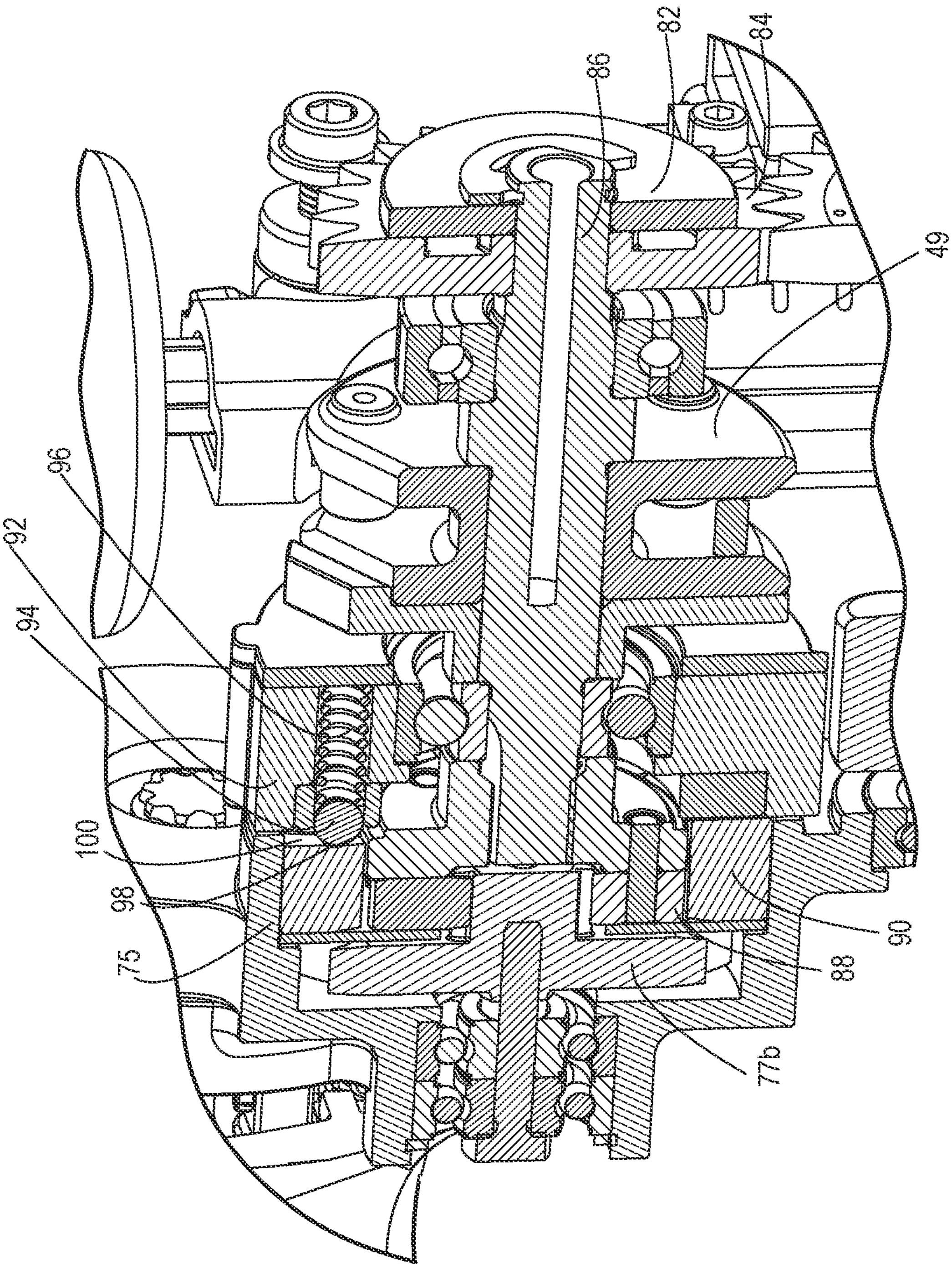
FIG. 5 is an enlarged, cross-sectional view of the fastener driver through line 5-5 in FIG. 3.

With reference to FIGS. 4 and 5, the output spur gear 77*b* drives a single-stage planetary transmission 82, the output of which drives the rotary lifter 49. The single-stage planetary transmission 82 includes a sun gear 84 coupled to the output spur gear 77*b* for co-rotation therewith, a plurality of planet gears 88 meshed with the sun gear 84, and a ring gear 90 with which the planet gears 88 are meshed that is positioned within the second gear case 75 (FIG. 5). The planet gears 88 are rotatably supported upon a carrier shaft 86 which, in turn, is rotatably supported within the lifting mechanism housing 76. The rotary lifter 49 is coupled for co-rotation with the carrier shaft 86.

A clutch 92 is also disposed within the lifting mechanism housing 76 to limit the amount of torque that can be transferred to the carrier shaft 86 and the rotary lifter 49. The clutch 92 includes ball detents 94 preloaded by compression springs 96. The ball detents 94 are wedged against axial ridges 98 disposed on an end face 100 of the ring gear 90, thereby preventing the ring gear 90 from rotation below a predetermined value of reaction torque applied to the rotary lifter 49 and the carrier shaft 86. If the reaction torque applied to the rotary lifter 49 exceeds the predetermined reaction torque value, such as when the rotary lifter 49 seizes while the motor 46 is activated, torque from the motor 46 is redirected by the clutch 92 to the ring gear 90 of the single-stage planetary transmission 82, causing it to rotate within the gearbox 74 (with the ball detents 94 riding up and over the axial ridges 98).

The drive shaft 70 is coupled between the output carrier of the first gearbox 66 and the input spur gear 77*a* of the second gearbox 74. In the illustrated embodiment of the drivetrain 62, a first end of the drive shaft 70 is coupled to the output carrier of the first gearbox 66, and an opposite, second end of the drive shaft 70 is coupled to the input spur gear 77*a* of the second gearbox 74. As such, the drive shaft 70 transfers torque from the first gearbox 66 to the second gearbox 74 in response to activation of the motor 46. This "split gearbox" design reduces the torsional load that must be carried by the drive shaft 70 (if used as a direct input to the lifting mechanism 42), thereby increasing the functional life of the drive shaft 70. The shape of the drive shaft 70 is thus optimized for performance and length of life to avoid high levels of stress associated with an otherwise large torsional load.

With continued reference to FIG. 4, the gas-spring powered fastener driver 10 further includes an outer housing 80 (depicted in FIG. 1) with a handle portion 78 to which the user-actuated trigger 44 is mounted. At least a portion of the drivetrain 62 is positioned within and extends through the handle portion 78 of the housing 80. In the illustrated embodiment of the driver 10, the drive shaft 70 is positioned within and extends through the handle portion 78 of the housing 80. Alternatively, the entirety of the drivetrain 62, including the motor 46, the first gearbox 66, the drive shaft 70, and the second gearbox 74 may be positioned within the handle portion 78 of the housing 80. Positioning the drivetrain 62, or portions thereof, within the handle portion 78 of the housing 80 permits the handle portion 78 to be located closer to the outlet of the fastener driver 10 compared to a traditional gas spring-powered fastener driver. And, the handle portion 78 is moved closer to the center of mass of the fastener driver 10, allowing the user more control over the fastener driver 10.

When a firing cycle or a fastener driving operation is initiated (e.g., by a user pulling the trigger 44), the motor 46 is activated to rotate the rotary lifter 49, releasing the driver blade 26 and permitting the gas in the storage chamber cylinder 18 to expand and push the piston 22 downward into the cylinder 18. Prior to reaching the driven position in the cylinder 18, the driver blade 26 impacts the fastener in the nosepiece 34, driving the fastener into the workpiece. During this time, the motor 46 remains activated, providing torque to the first gearbox 66, the drive shaft 70, and the second gearbox 74 to continue rotating the rotary lifter 49. Upon the driver blade 26 reaching the driven position, the rotary lifter 49 re-engages the rack 48, returning the driver blade 26 toward the ready position to again compress the gas stored in the cylinder 18 and the storage chamber cylinder 30.

Various features of the invention are set forth in the following claims.

What is claimed is:

1. A powered fastener driver comprising:

a housing;

a cylinder supported within the housing;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter rotatable about a first axis to move the piston and driver blade, in unison, from the BDC position toward the TDC position, the lifter configured to engage the driver blade when moving the driver blade from the BDC position toward the TDC position; and a drive unit operably coupled to the lifter, the drive unit including a motor having a second axis that is parallel to the first axis, and a motor output shaft extending along the second axis, the motor output shaft configured to drive a first spur gear that is enmeshed with a second spur gear operably coupled to the lifter;

wherein the first spur gear includes the same number of teeth as the second spur gear.

2. The powered fastener driver of claim 1, further comprising a storage chamber cylinder at least partially positioned within the housing in which a pressurized gas is contained, the cylinder at least partially positioned within the storage chamber cylinder and in fluid communication with the pressurized gas, wherein when the lifter moves the piston and driver blade, in unison, from the BDC position toward the TDC position, the gas in the storage chamber cylinder is compressed for a subsequent fastener driving operation.

3. The powered fastener driver of claim 1, wherein the driver blade includes a plurality of teeth extending along one side thereof, and wherein the lifter includes a plurality of drive pins engageable with the teeth when returning the driver blade from the BDC position to the TDC position.

4. The powered fastener driver of claim 1, wherein the second axis intersects the driving axis.

5. The fastener driver of claim 1, wherein the motor has a motor output shaft extending along the second axis, and further comprising a first gear box coupled to the motor output shaft to receive torque therefrom;

a second gear box having an output shaft coupled to the lifter to provide torque thereto; and a drive shaft having a first end coupled to the first gear box and a second end coupled to the second gear box for transferring torque from the first gear box to the second gear box, wherein the drive shaft is positioned within and extends through a handle portion of the housing.

6. The fastener driver of claim 5, wherein the first gearbox includes a first gear case and a multi-stage planetary transmission therein, and wherein the second gearbox includes a second gear case and meshed first and second spur gears therein.

7. The fastener driver of claim 6, wherein the spur gears are offset.

8. The fastener driver of claim 6, wherein the second spur gear is coupled for co-rotation with the second end of the drive shaft.

9. The fastener driver of claim 6, further comprising a single-stage planetary transmission positioned between the second spur gear and the lifter.

10. The fastener driver of claim 9, wherein the single-stage planetary transmission includes a sun gear coupled for co-rotation with the second spur gear, a carrier shaft rotatably supported by the housing, the lifter being coupled for co-rotation with the carrier shaft, a ring gear positioned within the second gear case, and a plurality of planet gears rotatably supported upon the carrier shaft and meshed with the ring gear.

11. The fastener driver of claim 10, further comprising a clutch configured to redirect torque from the motor to the ring gear of the single-stage planetary transmission, causing it to rotate within the second gear case, in response to a reaction torque applied to the lifter exceeding a predetermined value.

12. A powered fastener driver comprising:

a housing;

a cylinder supported within the housing;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter operable to move the piston and driver blade, in unison, from the BDC position toward the TDC position, the lifter configured to engage the driver blade when moving the driver blade from the BDC position toward the TDC position; and a drive unit operably coupled to the lifter, the drive unit including a motor having a first output shaft that extends along a motor axis and configured to drive a first spur gear, and a second output shaft operably coupled to the first output shaft via a second spur gear that is enmeshed with the first spur gear, the second output shaft extending along an axis that is parallel to the motor axis, wherein the lifter is operably coupled to the second spur gear, and wherein the first spur gear includes the same number of teeth as the second spur gear.

13. The powered fastener driver of claim 12, wherein the motor axis intersects the driving axis.

14. The powered fastener driver of claim 13, wherein the axis of the second output shaft is offset from the driving axis.

15. The powered fastener driver of claim 12, wherein the axis of the second output shaft is offset from the driving axis.

16. The powered fastener driver of claim 12, further comprising a storage chamber cylinder at least partially positioned within the housing in which a pressurized gas is contained, the cylinder at least partially positioned within the storage chamber cylinder and in fluid communication with the pressurized gas, wherein when the lifter moves the piston and driver blade, in unison, from the BDC position toward the TDC position, the gas in the storage chamber cylinder is compressed for a subsequent fastener driving operation.

17. The powered fastener driver of claim 16, wherein the driver blade includes a plurality of teeth extending along one side thereof, and wherein the lifter includes a plurality of drive pins engageable with the teeth when returning the driver blade from the BDC position to the TDC position.

18. The powered fastener driver of claim 12, wherein the second spur gear is coaxial with the first axis.

* * * * *